(12) United States Patent
Tokimasa et al.

(10) Patent No.: US 9,260,115 B2
(45) Date of Patent: Feb. 16, 2016

(54) VEHICLE CONTROL APPARATUS

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Mitsuhiro Tokimasa, Okazaki (JP); Youhei Masui, Nagoya (JP); Minoru Nakadori, Toyota (JP)

(73) Assignees: DENSO Corporation, Kariya, Aichi-pref. (JP); Toyota Jidosha Kabushiki Kaisha, Toyota, Aichi-ken (JP)

( * ) Notice: Subject to any disclaimer, the term of this patent is extended or adjusted under 35 U.S.C. 154(b) by 0 days.

(21) Appl. No.: 14/796,919

(22) Filed: Jul. 10, 2015

(65) Prior Publication Data

US 2016/0009283 A1    Jan. 14, 2016

(30) Foreign Application Priority Data

Jul. 11, 2014    (JP) .................................. 2014-143706

(51) Int. Cl.
*B60T 7/12*     (2006.01)
*B60W 30/16*    (2012.01)
*G01S 13/93*    (2006.01)

(52) U.S. Cl.
CPC .............. *B60W 30/16* (2013.01); *G01S 13/931* (2013.01); *B60W 2550/308* (2013.01); *G01S 2013/9325* (2013.01)

(58) Field of Classification Search
None
See application file for complete search history.

(56) References Cited

U.S. PATENT DOCUMENTS

| | | | |
|---|---|---|---|
| 2001/0015698 A1* | 8/2001 | Tokoro | G01S 7/354 342/70 |
| 2007/0250241 A1* | 10/2007 | Tanimichi | G08G 1/163 701/70 |

FOREIGN PATENT DOCUMENTS

JP    2004-330890    11/2004

* cited by examiner

*Primary Examiner* — Adam Alharbi
(74) *Attorney, Agent, or Firm* — Knobbe, Martens, Olson & Bear LLP

(57) ABSTRACT

A vehicle control apparatus for implementing inter-vehicle distance control of a subject vehicle carrying the apparatus behind a preceding vehicle based on reflected waves from a target that is a reflecting portion of the preceding vehicle. In the apparatus, a distance estimator is configured to calculate an estimated distance as an inter-vehicle distance between a rear end of the preceding vehicle and the subject vehicle based on an inter-vehicle distance variation calculated based on a relative speed of the target. A target determiner is configured to determine whether or not the target is displaced forward of the rear end of the preceding vehicle. A controller is configured to, when the target of the preceding vehicle is displaced forward of the rear end of the preceding vehicle, implement the inter-vehicle distance control based on the estimated distance calculated by the distance estimator.

9 Claims, 10 Drawing Sheets

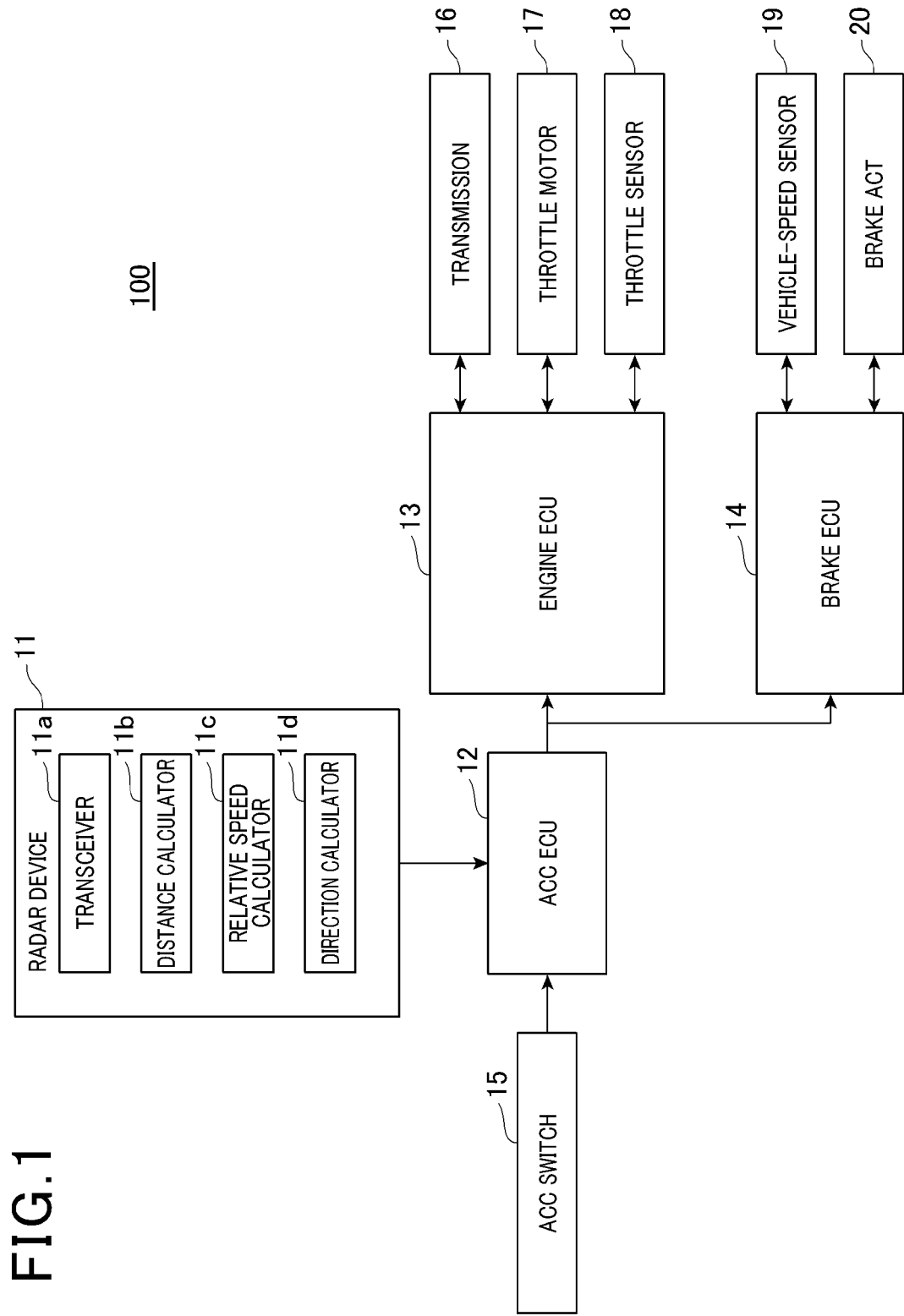

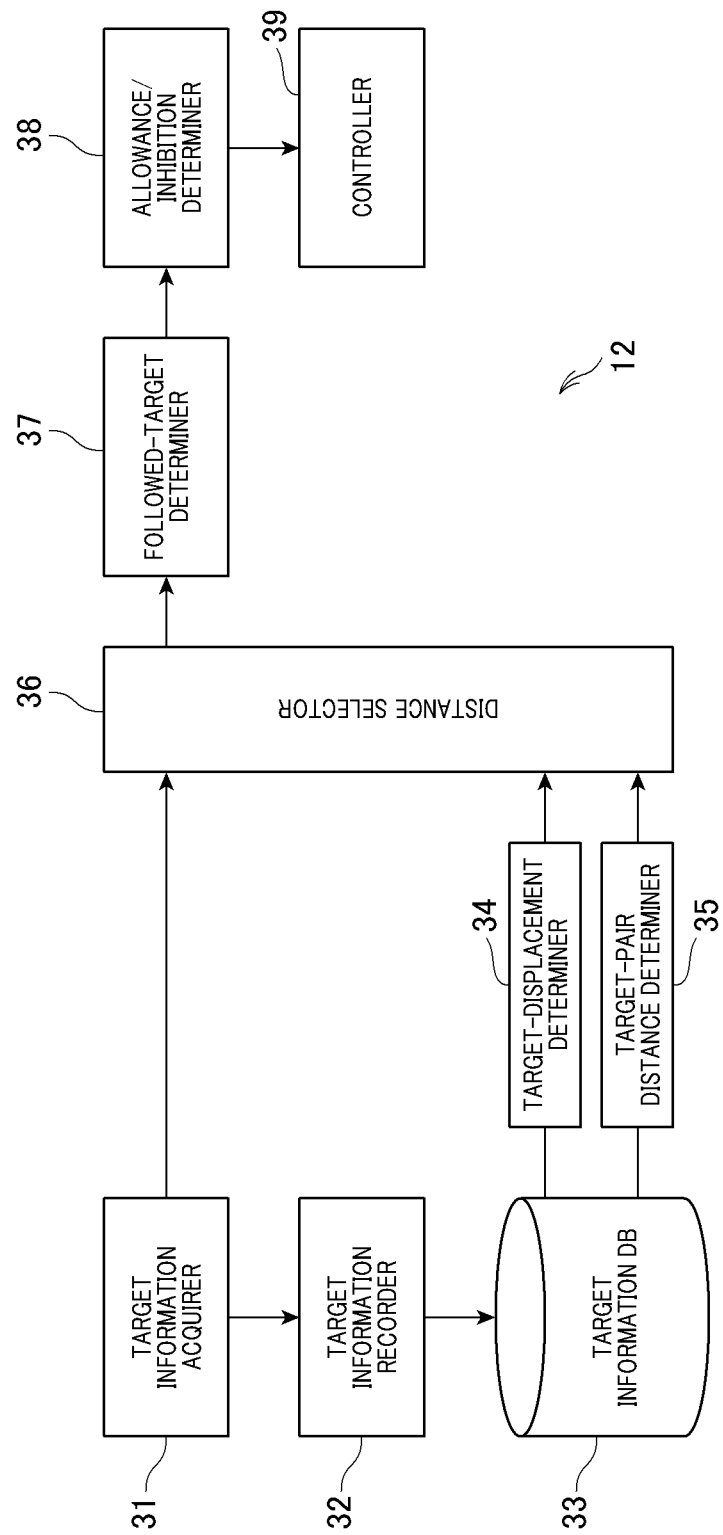

VEHICLE CONTROL APPARATUS

CROSS-REFERENCE TO RELATED APPLICATION

This application is based on and claims the benefit of priority from earlier Japanese Patent Applications No. 2014-143706 filed Jul. 11, 2014, the descriptions of which are incorporated herein by reference.

BACKGROUND

1. Technical Field

The present disclosure relates to a vehicle control apparatus for controlling an inter-vehicle distance between a vehicle carrying the apparatus and a preceding vehicle.

2. Related Art

A vehicle control apparatus is known that is configured to control an inter-vehicle distance between a vehicle carrying the apparatus (hereinafter referred to as a subject vehicle) and a preceding vehicle. Such a vehicle control apparatus may use a radar device to calculate a distance to the preceding vehicle and a relative speed of the preceding vehicle. The radar device is configured to transmit radar waves to the front of the subject vehicle and receive reflected waves from a target present forward of the subject vehicle, and calculate a distance to the target and a relative speed and a lateral position of the target to generate target information about the target.

The vehicle control apparatus is configured to, based on the target information, identify a target that is closest to the subject vehicle among a plurality of targets as a preceding vehicle, and control travel of the subject vehicle to bring the inter-vehicle distance between the subject vehicle and the preceding vehicle to a preset target inter-vehicle distance.

At a decreased distance from the preceding vehicle, the radar device may fail to detect a target corresponding to the rear end of the preceding vehicle. For example, in a case where the preceding vehicle is a large vehicle having the rear end at an elevated position, approach of the subject vehicle and the preceding vehicle may cause "underriding" or the like in some mounting conditions of the radar-device on the vehicle front, which refers to an event that the radar waves travel beneath a chassis of the like of the preceding vehicle. In such a case, a forward portion, rather than the rear end, of the preceding vehicle may be incorrectly identified as a target of the preceding vehicle that is closest to the subject vehicle.

Implementation of the inter-vehicle distance control of the subject vehicle behind such an incorrectly identified target may lead to an event that the inter-vehicle distance between the rear end of the preceding vehicle and the subject vehicle rapidly decreases as compared to the target inter-vehicle distance.

To prevent such failure, a known technique disclosed in Japanese Patent Application Laid-Open Publication No. 2004-330890 is configured to correct the inter-vehicle distance between the preceding vehicle and the subject vehicle. Such a technique is configured to, when a difference between previous and current values of the inter-vehicle distance increases above a predetermined value, determine that the underriding has occurred, store the difference between previous and current values of the inter-vehicle distance as an offset, and subtract the offset from the current value of the inter-vehicle distance, thereby enabling the inter-vehicle distance control to be implemented behind the rear end of the preceding vehicle even when the rear end of the preceding vehicle fails to be detected as a target.

However, the technique disclosed in Japanese Patent Application Laid-Open Publication No. 2004-330890 does not take into account a case that the preceding vehicle and the subject vehicle becomes spaced apart from each other. Therefore, there is room for improvement in the inter-vehicle distance control such that the inter-vehicle distance between the rear end of the preceding vehicle and the subject vehicle can be controlled to the preset target inter-vehicle distance also in such a case.

In consideration of the foregoing, exemplary embodiments of the present disclosure are directed to providing a vehicle control apparatus capable of properly implementing inter-vehicle distance control of a vehicle carrying the apparatus behind a preceding vehicle.

SUMMARY

In accordance with an exemplary embodiment of the present invention, there is provided a vehicle control apparatus for implementing inter-vehicle distance control of a vehicle carrying the apparatus behind a preceding vehicle based on reflected waves from a target that is a reflecting portion of the preceding vehicle, the vehicle carrying the apparatus being referred to as a subject vehicle, the reflected waves being radar waves transmitted to a front of the subject vehicle and then reflected from the target. The apparatus includes: a target information acquirer configured to acquire target information about the target from the reflected waves, the target information including a detected distance from the subject vehicle to the target and a relative speed between the subject vehicle and the target of the preceding vehicle; a distance estimator configured to calculate a variation of an inter-vehicle distance between a rear end of the preceding vehicle and the subject vehicle per predetermined time of period based on the relative speed, and calculate an estimated distance as the inter-vehicle distance between the rear end of the preceding vehicle and the subject vehicle based on the calculated variation of the inter-vehicle distance; a target determiner configured to determine whether or not the target of the preceding vehicle is displaced forward of the rear end of the preceding vehicle; and a controller configured to, when the target is present at the rear end of the preceding vehicle, implement the inter-vehicle distance control based on the detected distance from the subject vehicle to the target as the inter-vehicle distance, and when it is determined by the target determiner that the target of the preceding vehicle is displaced forward of the rear end of the preceding vehicle, implement the inter-vehicle distance control based on the estimated distance calculated by the distance estimator as the inter-vehicle distance.

When the target of the preceding vehicle is displaced forward of the rear end of the preceding vehicle, the inter-vehicle distance determined from the detected distance may abruptly decrease due to forward displacement of the target. In contrast, despite reflecting the forward displacement of the target, the estimated distance calculated based on the relative speed is less prone to abruptly decrease. Therefore, proper switching between the inter-vehicle distance control based on the detected distance and the inter-vehicle distance control based on the estimated distance can prevent incorrect understanding of the inter-vehicle distance, thereby enabling the inter-vehicle distance control to be implemented properly.

BRIEF DESCRIPTION OF THE DRAWINGS

FIG. 1 is a block diagram of a vehicle control system in accordance with one embodiment of the present disclosure;

FIG. 2A is a functional block diagram of an ACC ECU;

DESCRIPTION OF SPECIFIC EMBODIMENTS

Figure 2B:
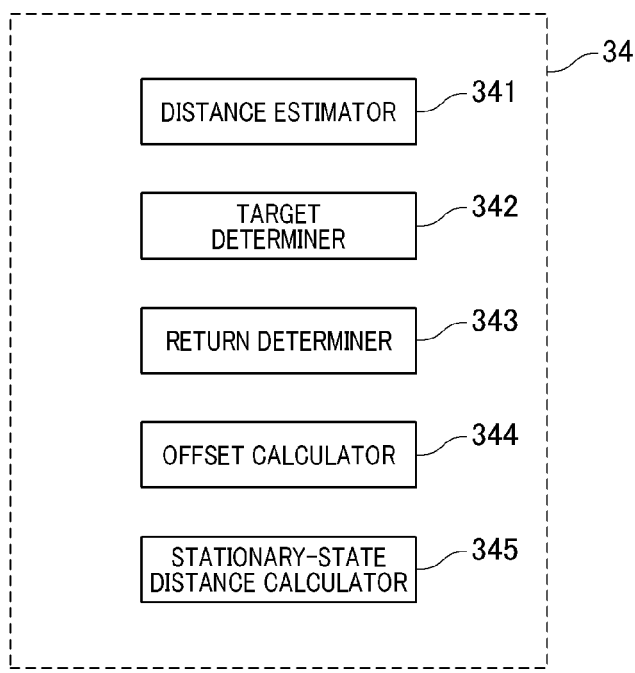
FIG. 2B is a functional block diagram of a target-displacement determiner.

Embodiments of the present disclosure will now be described with reference to the accompanying drawings. A vehicle control apparatus in accordance with one embodiment of the present disclosure is configured to implement adaptive cruise control, that is, control a distance from a vehicle carrying the apparatus (hereinafter referred to as a subject vehicle) to a preceding vehicle detected by the radar or the like to a target distance (referred to as a target inter-vehicle distance) as a function of a speed of the preceding vehicle during following travel. When the preceding vehicle is stopped, the subject vehicle stops at a proper distance from the preceding vehicle. When travel of the preceding vehicle is restarted, the subject vehicle restarts the following travel while maintaining the distance to the preceding vehicle in accordance with the speed of the preceding vehicle. When the preceding vehicle ceases to be detected, the subject vehicle suspends the following travel and transitions to steady state cruising at a vehicle speed set by a driver of the subject vehicle.

The vehicle control apparatus of the present embodiment is equipped with a full speed range adaptive cruise control (ACC) function. The full speed range refers to a range from zero or a very low speed to a predefined high speed (e.g., a legal speed or an upper limit speed set by the driver or the like). Enabling the adaptive cruise control in the full speed range (particularly in a low speed range) can reduce a driving load caused by frequent start/stop operations during a traffic jam. Although the inter-vehicle distance control, the following travel and the adaptive cruise control do not have the same meaning, they are used interchangeably in the present embodiment.

Referring to FIG. 1, an adaptive cruise control (ACC) apparatus 100 includes a radar device 11, an adaptive cruise control (ACC) electronic control unit (ECU) 12 (as the vehicle control apparatus), an engine ECU 13, and a brake ECU 14. The ACC ECU 12 is configured to implement the adaptive cruise control in conjunction with the radar device 11 and other ECUs.

The radar device 11 and the ECUs 12-14 are connected communicatively to each other via an onboard network, such as a controller area network (CAN). An adaptive cruise control (ACC) switch 15 is connected to the ACC ECU 12 via an exclusive line, such as a serial communication line. A transmission 16, a throttle motor 17, and a throttle sensor 18 are connected to the engine ECU 13 via exclusive lines. A vehicle-speed sensor 19 and a brake actuator (brake ACT) 20 are connected to the brake ECU via exclusive lines.

Each of the radar device 11 and the ECUs 12-14 is an information processor including a microcomputer, a power supply, a wiring harness interface and others. The microcomputer is of a well-known configuration including CPU, ROM, RAM, an input/output interface (I/O), and a CAN communication device. The CPU loads programs stored in the ROM into the RAM and executes the programs to receive signals from the sensors via the input/output interface and control the actuator and the like. The CAN communication device transmits data to and receives data from the other ECUs 12-14 and others via the CAN. It will be appreciated that partitioning of functions described later between these ECUs 12-14 is exemplary and other partitioning of functions between these ECUs 12-14 is also possible.

The radar device 11, which is an example of means for detecting a distance from the subject vehicle to the preceding vehicle, is configured to detect, for each target, a distance to the target and a relative speed and a lateral position of the target, and provide the detection result to the ACC ECU 12.

The radar device 11 is configured to transmit a radio-frequency signal in a millimeter waveband as transmit waves. In the present embodiment, any one of a frequency-modulated continuous-wave (FMCW) approach and a pulsed-radar approach and other well-known approaches may be used in the radar device 11 according to the type of transmission. The pulsed radar is configured to transmit the radar waves while changing the transmission direction of the transmit waves in a predetermined transmission range and determine a direction of a target from the transmission direction when reflected waves from the target are received. The FMCW approach will now be briefly explained.

The radar device 11 includes a transceiver 11a for transmitting and receiving radar waves. The transceiver 11a is configured to transmit the radar waves within a predetermined forward transmission range of the radar while linearly increasing the frequency with time at a predetermined increase rate and then linearly decreasing the frequency with time at a predetermined decrease rate. The radar waves reflected from a target forward of the subject vehicle are received by a plurality of antennas. The received waves are mixed with the transmit waves to generate a beat signal. The transceiver 11a is attached to the front side of the subject vehicle, such as a vehicle front grille, a bumper, a roof, a pillar or the like, at a position of a predetermined height.

A distance calculator 11b is configured to calculate a distance to the target based on the beat signal. That is, there are relations:

$$fr = (fb1 + fb2)/2, \text{ and}$$

$$fd = (fb2 - fb1)/2.$$

Here fb1 is a beat frequency in the upsweep interval, fb2 is a beat frequency in the downsweep interval, fr is a Doppler frequency at a relative speed of zero, and fd is a Doppler frequency at a non-zero relative speed (increased or decreased amount of frequency). Since the increase rate and the decrease rate are known, there is a fixed relationship between fr and the distance to the target. Therefore, the distance calculator 11b can calculate the distance to the target based on fb1 and fb2.

A Doppler frequency that is a variation in frequency between the transmit and receive waves is due to the Doppler effect. Therefore, there will be a fixed relationship between the relative speed and fd. A relative speed calculator 11c is configured to calculate the relative speed based on fb1 and fb2. The relative speed is defined by the speed of the subject vehicle minus the speed of the preceding vehicle. The relative speed takes a positive value when the distance decreases. The relative speed takes a negative value when the distance increases.

To acquire the beat frequencies fb1, fb2 from the beat signal, for example, Fourier transformation is applied to the beat signal in a digital signal processor (DSP) to analyze in which frequency band a prime component is present. Peaks occur at the power maxima in the spectrum of the beat signal. Thus, the beat frequencies are determined by peak frequencies of the beat signal (i.e., frequencies at which peaks appear that are equal to or greater than a predetermined threshold). Such peaks are indicative of the presence of a target.

A relative speed calculator 11c is configured to determine the beat frequency fb1 from a peak in the upsweep interval and the beat frequency fb2 from a peak in the downsweep interval. Thus, the distance to the target and the relative speed of the target can be detected. In the presence of a plurality of targets in the transmission range of the radar, a plurality of peaks may be detected in each of the upsweep and downsweep intervals.

A direction calculator 11d is configured to calculate a direction (or a lateral position) of a target relative to a frontal direction of the subject vehicle. The transceiver 11a has a plurality of receive antennas. When the target is present, other than in front of the subject vehicle, the beat signals received by the respective receive antennas are different in phase. Therefore, the direction of the target can be calculated using phase differences between the beat signals. Phases at the beat frequencies can be calculated through the Fourier transformation. In a monopulse method, the direction of the target can be calculated as follows. When the target is not present in the frontal direction of the subject vehicle, there is a path difference between the reflected waves received by two antennas. The path difference can be determined by a spacing between the two antennas and directions of the two antennas. Using the spacing between the receive antennas, wavelengths of the radio waves, and a fixed relationship between the phase difference and the path difference, the direction of the target corresponding to the path difference can be calculated from the phase difference between the beat signals received by the two receive antennas.

Alternatively, the direction of the target may be determined using digital beam forming (DBF) where a phased array antenna is realized by signal processing. For example, advancing or retarding the phase of one of beat signals received by two receive antennas that are different in phase allows the beat signals to match in phase where the signal intensity becomes maximal. Therefore, by changing the amount of phase shift of the beat signals received by the respective receive antennas and calculating a sum of signal intensities, the target can be estimated to be present in a direction corresponding to the amount of phase shift at which the total signal intensity becomes maximal. In the present embodiment, other methods for detecting the target direction including multiple signal classification (MUSIC) analysis, CAPON analysis and others may be used.

The radar device 11 is configured to transmit target information including the distance to the target and the relative speed and the direction of the target to the ACC ECU 12 every scan. In each scan, as described above, the frequency of the transmit wave is linearly increased in the upsweep interval and then linearly decreased in the downsweep interval subsequent to the upsweep interval. In the presence of a plurality of targets, the radar device 11 is configured to transmit target information about each of the targets to the ACC ECU 12 every scan. The radar device 11 is configured to update the target information every predetermined time period. The predetermined time period for one update cycle is set to, for example, 50 msec.

The radar device 11 of the present embodiment is configured to, in the presence of a target forward of the subject vehicle and a reflection point that is not recognized as a target, but determined to belong to the same preceding vehicle as the target, transmit information about the target forward of the subject vehicle and the reflection point to the ACC ECU 12. Such a reflection point is hereinafter referred to as a non-target reflection point, and a pair of the target forward of the subject vehicle and the non-target reflection point are referred to as a target pair. For example, in the presence of a target forward of the subject vehicle and a reflection point that is not recognized as a target, but has a peak above a predetermined threshold and below the peak of the target, the reflection point being closer to the subject vehicle than the target forward of the subject vehicle and spaced apart from the target forward of the subject vehicle by a distance equal to or less than a predetermined value (e.g., 5 m), at a vertical position of a height equal to or less than a vehicle height, at a lateral position of a width equal to or less than a vehicle width relative to the target, the speed of the reflection point relative to the target being equal to or less than a predetermined value, the radar device 11 transmits information about the target pair of the target forward of the subject vehicle and the reflection point to the ACC ECU 12.

The ACC ECU 12 is configured to, based on the target information, a current vehicle speed, an acceleration and the like received from the radar device 11, transmit required drive forces or brake demand or the like to another ECU.

The adaptive cruise control (ACC) switch 15 is configured to, when operated by the driver of the subject vehicle to permit the full speed range adaptive cruise control, notify the ACC ECU 12 of it. For example, the adaptive cruise control (ACC) switch 15 is configured to notify to the ACC ECU 12 operational signals, such as signals for turning ON or OFF of the full speed range adaptive cruise control, switching between an adaptive cruise control mode and a constant speed control mode, settings of a vehicle speed for constant speed travel, settings of the inter-vehicle distance, and others. In the present embodiment, it is assumed that the subject vehicle travels in the adaptive cruise control mode. In the absence of a preceding vehicle, the subject vehicle remains in the adaptive cruise control mode and travels at a constant speed, which will be described later in more detail.

The engine ECU 13 is configured to control the throttle motor 17 while monitoring a throttle opening detected by the throttle sensor 18. For example, based on a table showing throttle openings corresponding to vehicle speeds and acceleration instruction values, the engine ECU 13 determines the throttle opening corresponding to the acceleration instruction value received from the ACC ECU 12 and the current vehicle speed. In addition, the engine ECU 13 determines the need for a gear change based on an up-shift line and a down-shift line predefined for the vehicle speed and the throttle opening, and if necessary, instruct the transmission 16 to change the gear. The transmission 16 may include a known mechanism, such as the automatic transmission (AT) or the continuously variable transmission (CVT).

The brake ECU 14 is configured to brake the subject vehicle by controlling opening and closing and a degree of opening of the valve of the brake ACT 20. The brake ACT 20 is configured to control the acceleration (deceleration) of the subject vehicle by increasing, maintaining, or decreasing the wheel cylinder pressure for each wheel. The brake ECU 14 is configured to brake the subject vehicle in response to the acceleration instruction value from the ACC ECU 12.

The acceleration instruction value determined by the ACC ECU 12 is transmitted to the engine ECU 13 and the brake ECU 14. As a result, the throttle motor 17 or the brake ACT 20 is controlled so that the subject vehicle can travel following the preceding vehicle while maintaining the target inter-vehicle distance. Under control of the engine ECU 13 and the brake ECU 14, the throttle opening may be increased, the throttle opening may be fully closed to decelerate the subject vehicle via engine braking, air resistance, or rolling resistance, or the throttle opening may be fully closed to decelerate the subject vehicle by the brake act 20 increasing the wheel cylinder pressure.

(Functions of ACC ECU)

FIG. 2A shows a functional block diagram of the ACC ECU 12. The ACC ECU 12 includes a target information acquirer 31, a target information recorder 32, a target information database (DB) 33, a target-displacement determiner 34, a target-pair distance determiner 35, a distance selector 36, a followed-target determiner 37, an allowance/inhibition determiner 38, and a controller 39. In the present embodiment, the adaptive cruise control is implemented by using target information about the target that is closest to the subject vehicle (hereinafter referred to as a followed target) among a plurality of targets that are different reflecting portions of the same preceding vehicle. The same preceding vehicle is an object having a plurality of targets determined to have a substantially same speed while maintaining the same spacing between each other.

The target information acquirer 31 is configured to acquire target information about one or more targets from the radar device 11. The target information recorder 32 stores the target information about each target in the target information DB 33. More specifically, the target information recorder 32 is configured to assign a unique identifier (ID) to each target and record a distance, a relative speed, and a lateral position of each target. The target information acquirer 31 is configured to acquire information about the target pair from the radar device 11.

For each target, the lateral position of the target is a position of the target in the widthwise direction of the subject vehicle relative to the lateral center of the subject vehicle, and is calculated from the direction of the target and the distance to the target. The right direction from the lateral center of the subject vehicle may be defined as a positive direction, and the left direction from the lateral center of the subject vehicle may be defined as a negative direction. In the full speed range ACC, the subject vehicle follows the preceding vehicle that is closest to the subject vehicle and does not have to follow preceding vehicles traveling in lanes other than the traveling lane of the subject vehicle that is a lane in which the subject vehicle is traveling. Therefore, the target or targets, information of which has to be recorded, may belong to the preceding vehicle traveling in the same lane as the subject vehicle.

The radar device 11 is configured to transmit the target information every cycle time. The target information recorder 32 is configured to assign the same identifier to the same target and record the target information in the target information DB 33. For example, when a lateral position of a target received from the radar device 11 is displaced from the lateral position of the target recorded in the target information DB 33 by a distance equal to or less than a maximum variation of the lateral position during one cycle, these targets are determined as the same target. Alternatively, when a difference between a distance to a target received from the radar device 11 and the distance to the target recorded in the target information DB 33 is equal to or less than a maximum variation of the distance during one cycle, these targets are determined as the same target. Thereafter, the target information recorder 32 updates the target information associated with the same identifier recorded in the target information DB 33.

The target-displacement determiner 34 is configured to, based on the target information stored in the target information DB 33, determine whether or not a detected state of the identifier of the target corresponding to the rear end of the preceding vehicle has changed, that is, determine whether or not the target with the shortest detected distance has been displaced. The rear end of the preceding vehicle is determined as the target that is closest to the subject vehicle which is spaced apart from the preceding vehicle by a distance equal to or greater than a predetermined value. If the detected state of the identifier of the target corresponding to the rear end of the preceding vehicle has changed, that is, if the target with the shortest distance has been displaced, it is determined that the radar waves are overriding or underriding the rear end of the preceding vehicle. The target-displacement determiner 34 is configured to estimate a distance to the rear end of the preceding vehicle based on the relative speed Vz, and then output the estimated distance to the distance selector 36 as a first inter-vehicle distance.

As shown in FIG. 2B, the target-displacement determiner 34 includes a distance estimator 341, a target determiner 342, a return determiner 343, an offset calculator 344, and a stationary-state distance calculator 345. Processes performed in the target-displacement determiner 34 will be explained later in more detail.

The target-pair distance determiner 35 is configured to, in the presence of the target pair, calculate a separation distance between the target and the non-target reflection point of the pair (hereinafter referred to as a target-pair distance). When the target-pair distance is recognized for a predetermined period of time or more, the target-pair distance of the target pair is set as an offset. The target-pair distance determiner 35 is configured to, when the target-pair distance is being recognized, that is, when the target-pair distance is recognized for the predetermined period of time or more, output a first corrected distance, as a second inter-vehicle distance, calculated by subtracting the target-pair distance from the detected distance to the target to the distance selector 36, and when the target-pair distance is not being recognized, that is, when the target-pair distance is recognized for less than the predetermined period of time, output a second corrected distance, as a second inter-vehicle distance, calculated by subtracting the offset from the detected distance to the target to the distance selector 36.

The distance selector 36 is configured to, for each target detected, select one of the detected distance acquired from the target information acquirer 31, the first inter-vehicle distance acquired from the target-displacement determiner 34, and the second inter-vehicle distance acquired from the target-pair distance determiner 35, as an inter-vehicle distance for the target. For example, the distance selector 36 may select a shortest one of the detected distance, the first inter-vehicle distance, and the second inter-vehicle distance. The followed-target determiner 37 is configured to determine one of the targets detected that has a shortest inter-vehicle distance, as a followed target.

The allowance/inhibition determiner 38 is configured to, based on the inter-vehicle distance and the identifier of the followed target received from the followed-target determiner 37; determine whether or not a detected state of the followed target is unstable. The allowance/inhibition determiner 38 is configured to, when determining that the detected state of the followed target is unstable, inhibit the following travel, and when the detected state of the followed target becomes stable, allow resumption of the following travel.

In some travel environments or weather, the reflected waves from the preceding vehicle may become unstable despite the target-displacement determination process and the target-pair distance determination processes being performed, which may cause the rear end of the preceding vehicle to become unable to be stably detected. In the present embodiment, the allowance/inhibition determiner 38 is configured to, when the target determined as the followed target cannot be stably detected under a certain condition, determine that the rear end of the preceding vehicle is unable to be estimated and then instruct the controller 39 to make a switch to the direct operation by the driver.

The controller 39 is configured to implement the adaptive cruise control based on the inter-vehicle distance selected by the distance selector 36 so that the subject vehicle can travel following the preceding vehicle while maintaining the target inter-vehicle distance.

The target-displacement determiner 34 and the target-pair distance determiner 35 will now be explained in more detail.

(Target-Displacement Determination)

In the case of the preceding vehicle being a vehicle with its rear end at a high position, such as a large vehicle, or a vehicle with its rear end at a low position, such as a low-floor vehicle, there may be a difference in height position between the rear end (or a rear surface) of the preceding vehicle and the radar device 11. Therefore, as the inter-vehicle distance between the preceding vehicle and the subject vehicle decreases, the rear end of the preceding vehicle may become undetectable by the radar device 11 as a target.

Figure 3A:
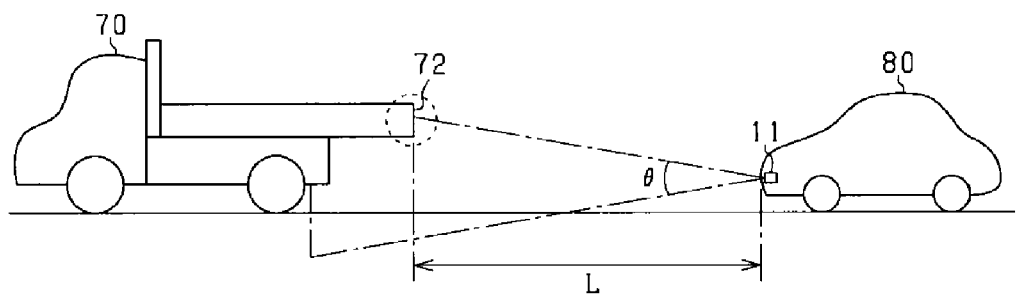
FIGS. 3A and 3B are examples of detecting a rear end of a preceding vehicle.
Figure 3B:
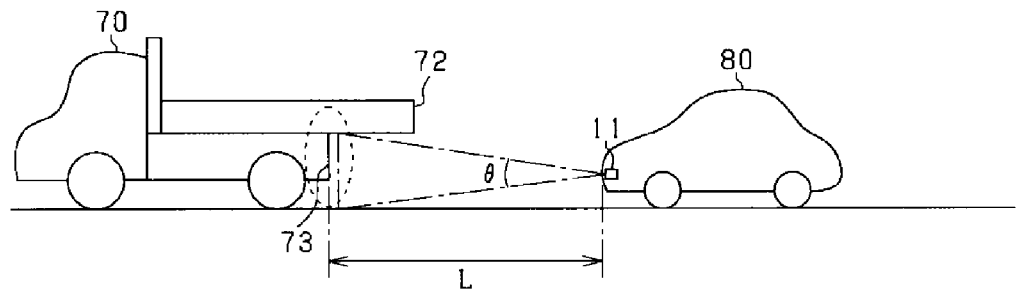

For example, when as shown in FIG. 3A the preceding vehicle 70 and the subject vehicle 80 are apart from each other and the rear end 72 of the preceding vehicle 70 is within an area that spans a detection angle θ of the radar waves, the rear end 72 can be detected as a target. However, when as shown in FIG. 3B the preceding vehicle 70 approaches the subject vehicle 80 so that the inter-vehicle distance is decreased and the rear end 72 is out of the area that spans the detection angle θ of the radar waves, target displacement occurs, that is, the radar waves override the rear end 72 of the preceding vehicle, or the radar waves underride the rear end 72. In such a case, an anterior portion (e.g., a chassis or the like) to the rear end 72 of the preceding vehicle may be detected, which may result in a distance between the preceding vehicle and the subject vehicle less than a target inter-vehicle distance. In each of FIGS. 3A and 3B, the distance L is a detected distance to a target recognized as the rear end of the preceding vehicle 70 (hereinafter referred to as a rear-end target). The rear-end target is a target that is closest to the subject vehicle among the targets on the preceding vehicle. Such a detected distance is hereinafter referred to as a "rear-end detected distance".

In the present embodiment, in the case that the radar waves are overriding or underriding the rear end (i.e., the target displacement has occurred), a variation of the inter-vehicle distance between the preceding vehicle and the subject vehicle per predetermined time of period is calculated using the relative speed between the preceding vehicle and the subject vehicle, and estimation of the inter-vehicle distance (i.e., calculation of the first inter-vehicle distance) is implemented based on the variation of the inter-vehicle distance between the preceding vehicle and the subject vehicle per predetermined time of period. This can prevent the inter-vehicle distance between the preceding vehicle and the subject vehicle from abruptly changing due to the overriding or underriding of the radar waves.

In the radar device 11, the variation of the inter-vehicle distance between the preceding vehicle and the subject vehicle may be calculated every distance measurement period of time (e.g., 50 msec) using one of the following equations:

$$\Delta D1 = D(i) - D(i-1) \quad (1)$$

$$\Delta D2 = ((Vz(i) + Vz(i-1))/2) \times tm. \quad (2)$$

In the equation (1), a distance variation $\Delta D1$ is calculated using a radar-measured distance as the detected distance. $D(i)$ is a current value of the detected distance, and $D(i-1)$ is a previous value of the detected distance. In the case that the radar waves are overriding or underriding the rear end of the preceding vehicle, the current and previous values of the detected distance may be detected distance values of targets with different identifies (see FIGS. 3A and 3B). In the equation (2), a distance variation $\Delta D2$ is calculated using the relative speed between the preceding vehicle and the subject vehicle. $Vz(i)$ is a current value of the relative speed, and $Vz(i-1)$ is a previous value of the relative speed. $tm$ is a distance measurement period of time in the radar device 11. The distance variation $\Delta D1$ calculated according to the equation (1) can reliably reflect the distance variation caused by the target displacement. The distance variation $\Delta D2$ calculated according to the equation (2) is less susceptible to the distance variation caused by the target displacement. In the present embodiment, the estimated distance is calculated as a the first inter-vehicle distance by iteratively adding the distance variation $\Delta D2$ calculated according to the equation (2) to the previous estimated distance.

When the radar waves override or underride the rear end of the preceding vehicle (the target displacement occurs), the distance variation $\Delta D1$ calculated using the current and previous values of the detected distance and the distance variation $\Delta D2$ calculated using the current and previous values of the relative speed develop differently. Therefore, monitoring developments of the distance variations $\Delta D1$ and $\Delta D2$, it can be determined whether or not the target displacement has occurred, such as overriding or underriding of the radar waves.

Figure 4A:
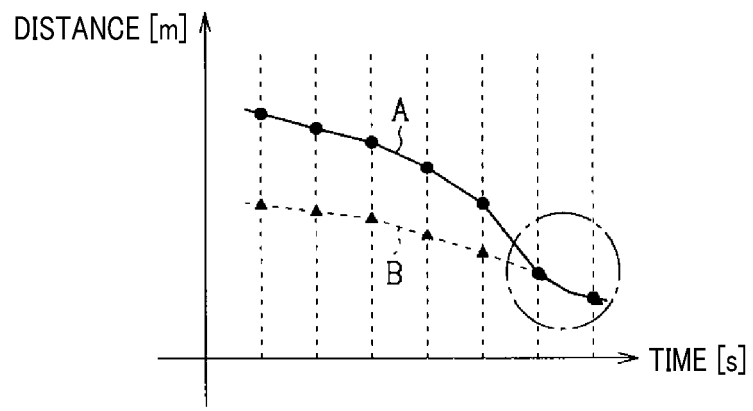
FIGS. 4A to 4C are examples of a target-displacement determination process performed in the ACC ECU.
Figure 4B:
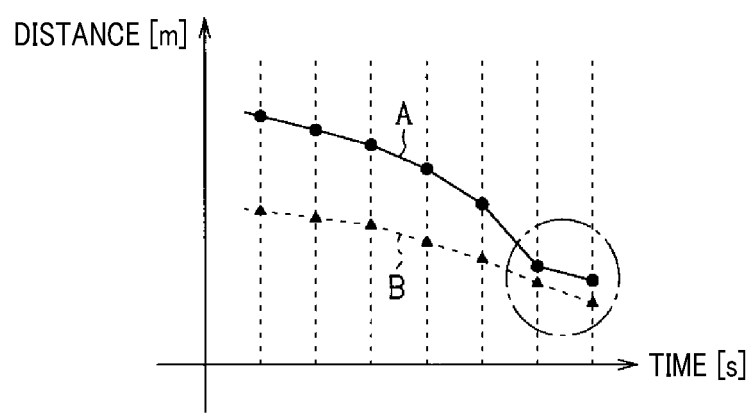
Figure 4C:
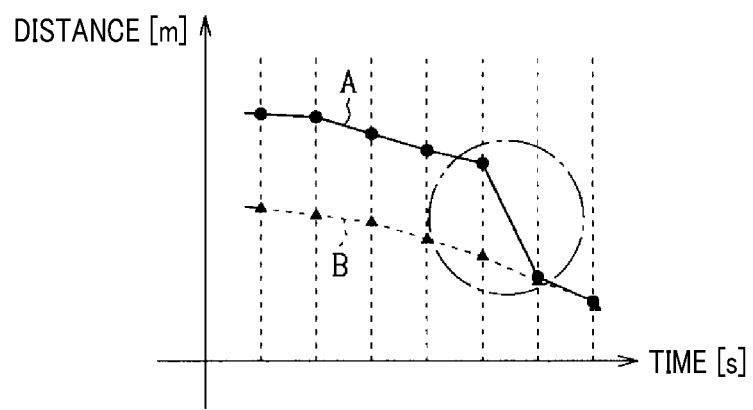

The increased inter-vehicle distance between the preceding vehicle and the subject vehicle may increase after it is determined that the radar waves are overriding or underriding the rear end of the preceding vehicle, that is, the target displacement has occurred, an An increased inter-vehicle distance between the preceding vehicle and the subject vehicle may resolve the overriding or underriding of the radar waves. That is, the situation of FIG. 3B may transition to the situation of FIG. 3A. In such a case, based on the detected distance between the preceding vehicle 70 and the subject vehicle 80 (i.e., the rear-end detected distance) and the estimated distance, it is determined whether or not the overriding or underriding of the radar waves has been resolved. More specifically, it can be determined that the overriding or underriding of the radar waves has been resolved, when the detected distance A and the estimated distance B coincide with each other as shown in FIG. 4A, when a difference between the detected distance A and the estimated distance B is within a predetermined range as shown in FIG. 4B, or when the detected distance A abruptly changes to approach the estimated distance B as shown in FIG. 4C. After the overriding or underriding of the radar waves is resolved, a switch to outputting the rear-end detected distance as the first inter-vehicle distance is made, which allows a return to the adaptive cruise control based on the rear-end detected distance to be made. It is determined by the return determiner 343 whether or not whether or not the overriding or underriding of the radar waves has been resolved.

When the subject vehicle and the preceding vehicle are stopped whilst it is determined that the radar waves are overriding or underriding the rear end of the preceding vehicle, a switch to calculating the first inter-vehicle distance using the rear-end detected distance (the measured distance from the radar device 11) and then outputting the calculated first inter-vehicle distance is made. Then, an offset between the rear-end detected distance and the estimated distance at the time the vehicles are stopped is calculated. Whilst both the preceding vehicle and the subject vehicle are stationary, the inter-vehicle distance that is calculated by subtracting the offset from the rear-end detected distance is outputted as the first inter-vehicle distance. This allows the inter-vehicle distance between the rear end of the preceding vehicle and the subject vehicle to be recognized while they are stationary and to reflect the distance variations that occur while the vehicles are stationary.

(Target-Pair Distance Determination Process)

In the present embodiment, the target that is forward of the subject vehicle and closest to the subject vehicle is recognized as a target to be followed in the adaptive cruise control. If the target is not a target corresponding to the rear end of the preceding vehicle (but a target corresponding to a middle portion of the preceding vehicle), there may be another reflection point that is closer to the subject vehicle than the target.

Figure 5:
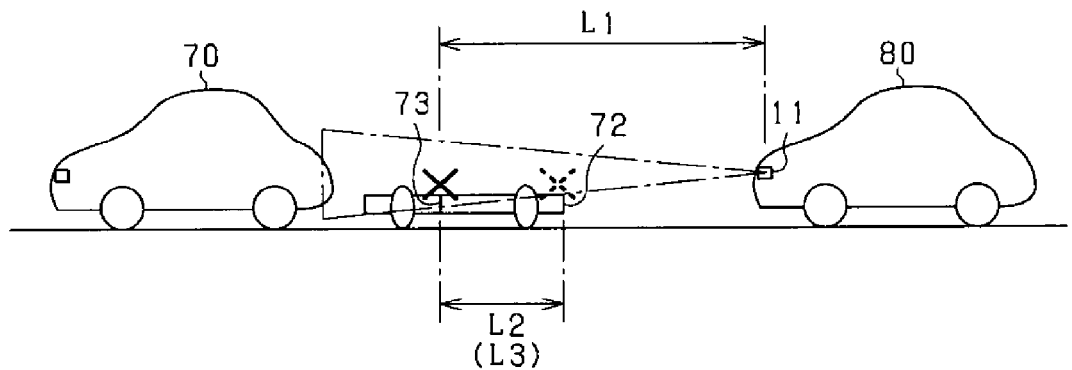
FIG. 5 is an example of a target-pair distance determination process performed in the ACC ECU.

For example, in the case of the preceding vehicle 70 having a car carrier as shown in FIG. 5, a small area of the rear end of the preceding vehicle may lead to weak reflected waves from the rear end. Therefore, another reflection point 72 that is not recognized as a target may appear at a position closer to the subject vehicle than the target 73. Preferably, in such a case, the adaptive cruise control is implemented taking into account the reflection point 72. Such another reflection point 72 is hereinafter referred to as a non-target reflection point.

In the present embodiment, such a reflection point 72 that is not recognized as a target and the target 73 form a target pair as defined above. The ACC ECU 12 is configured to, upon detecting such a target pair, calculate a target-pair distance L2 between the target 73 and the non-target reflection point 72. Further, when the target-pair distance L2 is recognized for a predetermined period of time or more, the target-pair distance L2 is retained as an offset L3. When the target-pair distance is being recognized, that is, when the target-pair distance L2 is recognized for the predetermined period of time or more, a second inter-vehicle distance that is calculated by subtracting the target-pair distance L2 from the detected distance L1 is outputted to the distance selector 36. When the target-pair distance is not being recognized, that is, when the target-pair distance L2 is recognized for less than the predetermined period of time, a corrected distance that is calculated by subtracting the offset L3 from the detected distance L1 to the target 73 is outputted to the distance selector 36 as a second inter-vehicle distance.

Principally, in the present embodiment, the distance to and the direction of the rear end of the preceding vehicle traveling forward of the subject vehicle are measured by the radar device 11. Based on the measurement result, the adaptive cruise control is implemented. However, without stable detection of the rear end of the preceding vehicle, a failure might occur in controlling the inter-vehicle distance to the target inter-vehicle distance.

For example, when there is a difference in height position between the rear end of the preceding vehicle (e.g., a rear side portion) and the radar device 11, the rear end of the preceding vehicle may be no longer within the detection zone (that spans a detection angle θ of the radar waves) of the radar device 11 depending on an actual distance between the preceding vehicle and the subject vehicle. In such a case, despite the presence of the rear end of the preceding vehicle, the radar device 11 may fail to detect the rear end of the preceding vehicle, as shown in FIGS. 3A and 3B. To overcome such a disadvantage due to the target displacement, the target-displacement determiner 34 is configured to determine whether or not the target displacement has occurred, and when determining that the target displacement has occurred, calculate the first inter-vehicle distance calculated by subtracting the offset from the detected distance.

In the case of a small area of the rear end portion of the preceding vehicle, the reflected waves from the rear end may be weak in intensity. Due to the weakness of the reflected waves, another reflection point that is not recognized as a target may appear at a position closer to the subject vehicle than the target closest to the subject vehicle. In such a case, a failure might occur in controlling the inter-vehicle distance to the target distance, as shown in FIGS. 5A and 5B. To overcome such a disadvantage due to the presence of the target pair caused by the weakness of the reflected waves, the target-pair distance determiner 35 is configured to calculate the second inter-vehicle distance calculated by subtracting the target-pair distance or the offset from the detected distance.

(Active Cruise Control Process)

An active cruise control process to be performed in the ACC ECU 12 will now be explained with reference to a flowchart of FIG. 6.

This process is repeatedly performed every predetermined period of time.

Figure 6:
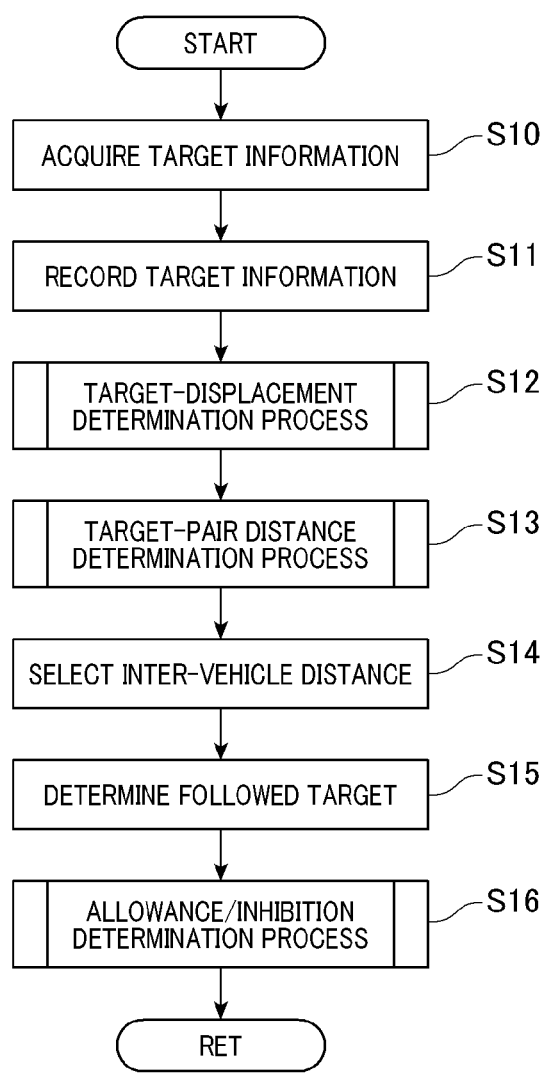
FIG. 6 is a flowchart of an adaptive cruise control process performed in the ACC ECU.

Referring to FIG. 6, in step S10, the target information acquirer 31 acquires the target information from the radar device 11. In step S11, the target information recorder 32 assigns the same identifier to the same target, and record the target information in the target information DB 33.

In step S12, a target-displacement determination process is performed, where the target-displacement determiner 34 determines, from the detected state of the rear end of the preceding vehicle, whether or not the radar waves are overriding or underriding the rear end of the preceding vehicle, and when determining that the radar waves are overriding or underriding the rear end of the preceding vehicle, calculate the first inter-vehicle distance.

In step S13, a target-pair determination process is performed, where the target-pair distance determiner 35 is configured to, in the presence of the target pair, calculate the target-pair distance. When the target-pair distance is recognized for the predetermined period of time or more, the target-pair distance of the target pair is calculated as an offset. Depending on whether or not the target-pair distance is being recognized, the target-pair distance determiner 35 calculates the second inter-vehicle distance that is the detected distance corrected by the target-pair distance or the offset.

In step S14, a distance selection process is performed, where for each target detected, the distance selector 36 selects a shortest one of the detected distance, the first inter-vehicle distance, and the second inter-vehicle distance, and associates the target with the selected inter-vehicle distance. In step S15, a followed-target determination process is performed, where the followed-target determiner 37 determines the target associated with a shortest one of the inter-vehicle distances selected in step S14 for the respective targets as a followed target.

In step S16, an allowance/inhibition determination process is performed, where the allowance/inhibition determiner 38 determines whether or not the followed target is stably detected, and when it is determined that the followed target is stably detected, allows the controller 39 to implement the adaptive cruise control to follow the followed target determined in step S15. When it is determined that the followed target is not stably detected, the allowance/inhibition determiner 38 inhibits the controller 39 from implementing the adaptive cruise control and instructs the controller 39 to make a switch to the direct operation by the driver.

The calculation of the first inter-vehicle distance implemented in step S12 by the target-displacement determiner 34 may be performed in the exemplary situation shown in FIGS. 3A and 3B, and the calculation of the second inter-vehicle distance implemented in step S13 by the target-pair distance determiner 35 may be performed in the exemplary situation shown in FIGS. 5A and 5B. The calculation of the first inter-vehicle distance and the calculation of the second inter-vehicle distance may be selectively implemented depending on in what state the subject vehicle travels following the preceding vehicle.

(Target-Displacement Determination Process)

Figure 7:
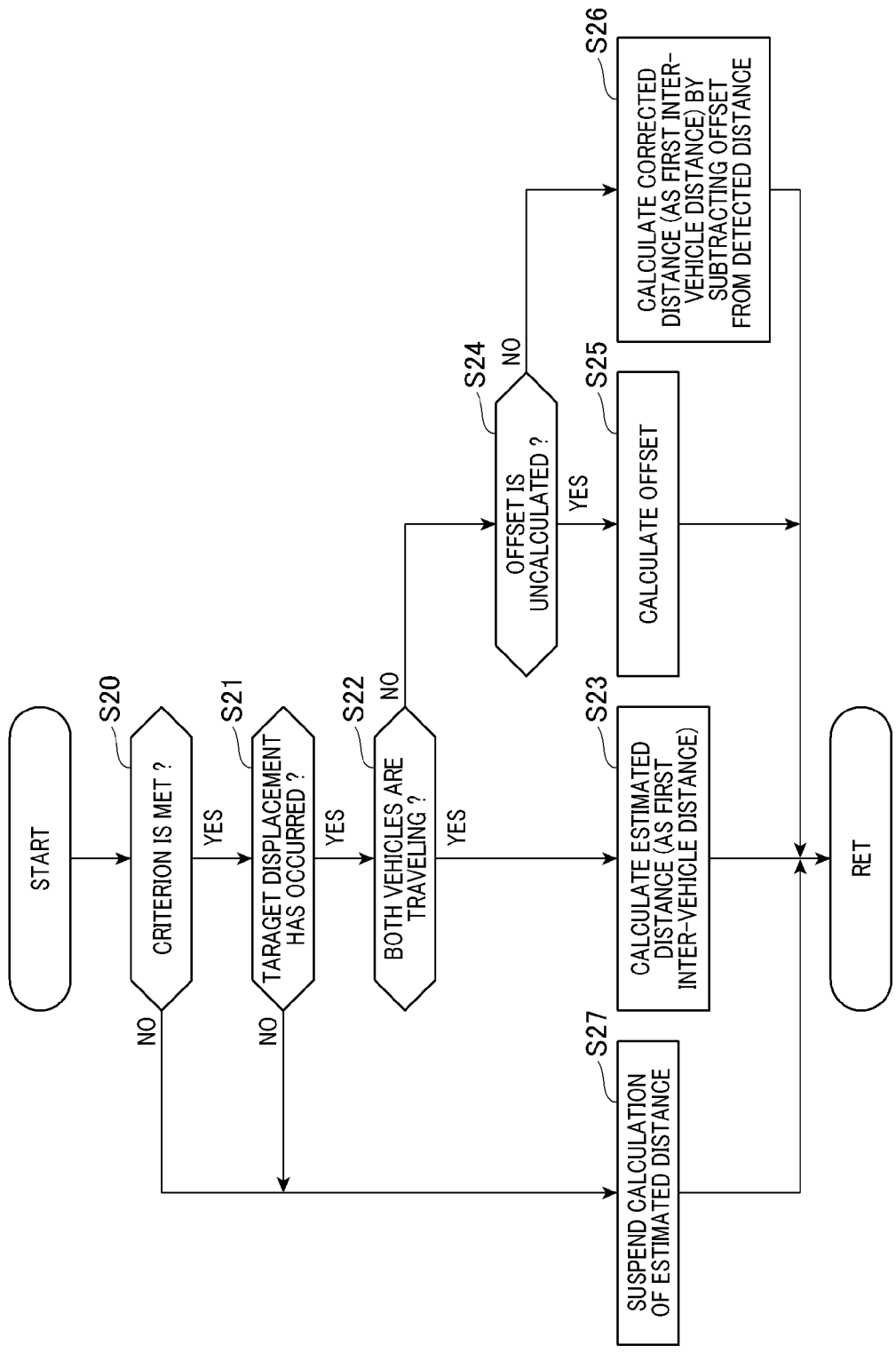
FIG. 7 is a flowchart of the target-displacement determination process performed in the ACC ECU.

The target-displacement determination process in step S12 of FIG. 6 will now be explained. In FIG. 7, it is determined in step S20 whether or not a criterion for determining the target displacement is met. The criterion is met if all first to third conditions are met. The first condition is that the detected distance is equal to or less than a predetermined value (e.g., equal to or less than 30-40 m), the second condition is that the relative speed is within a predetermined range, and the third condition is that the vehicle speed is less than a predetermined value (e.g., less than 200-100 km/h).

If it is determined in step S20 that the criterion is met, then in step 21 it is determined whether or not the radar waves are overriding or underriding the rear end of the preceding vehicle, that is, the target displacement has occurred. In step S21, the determination is made based on the difference in development between the variation of the detected distance and the variation of the relative speed. More specifically, the distance variation $\Delta D1$ calculated from the previous and current values of the detected distance and the distance variation $\Delta D2$ calculated from the previous and current values of the relative speed are compared with each other. If the value of $\Delta D1-\Delta D2$ is equal to or greater than a predetermined value, then it is determined that the radar waves are overriding or underriding the rear end of the preceding vehicle, that is, the target displacement has occurred.

Alternatively, it may be determined whether or not the distance variation $\Delta D1$ calculated from the previous and current values of the detected distance is equal to or greater than a predetermined value. If it is determined that the distance variation $\Delta D1$ is equal to or greater than the predetermined value, then it may be determined that the radar waves are overriding or underriding the rear end of the preceding vehicle, that is, the target displacement has occurred.

If it is determined in step S21 that the target displacement has occurred, then in step S22 it is determined whether or not both the preceding vehicle and the subject vehicle are traveling. If it is determined in step S22 that both the preceding vehicle and the subject vehicle are traveling, then in step S23 the estimated distance is calculated as the first inter-vehicle distance. If both the preceding vehicle and the subject vehicle are stationary, then in step 24 it is determined whether or not the offset between the estimated distance obtained at the time both the preceding and subject vehicles are stopped and the rear-end detected distance is uncalculated. If the offset is uncalculated, then in step S25 the offset is calculated by subtracting the estimated distance obtained at the time both the preceding and subject vehicles are stopped from the rear-end detected distance.

If the offset has been calculated, then in step S26 the first inter-vehicle distance is calculated by subtracting the offset from the rear-end detected distance.

If it is determined in step S20 that the criterion is not met or if the target displacement has not occurred, then in step S27 the calculation of the estimated distance is suspended.

Referring again to FIG. 2B, the distance estimator 341 is responsible for execution of the operation in step S23, the target determiner 342 is responsible for execution of the operation in step S21, the offset calculator 344 is responsible for execution of the operations in step S25, and the stationary-state distance calculator 345 is responsible for execution of the operation in step S26. The return determiner 343 is configured to determine whether or not the target of the preceding vehicle has returned from a position forward of the rear end to the rear end.

(Target-Pair Distance Determination Process)

Figure 8:
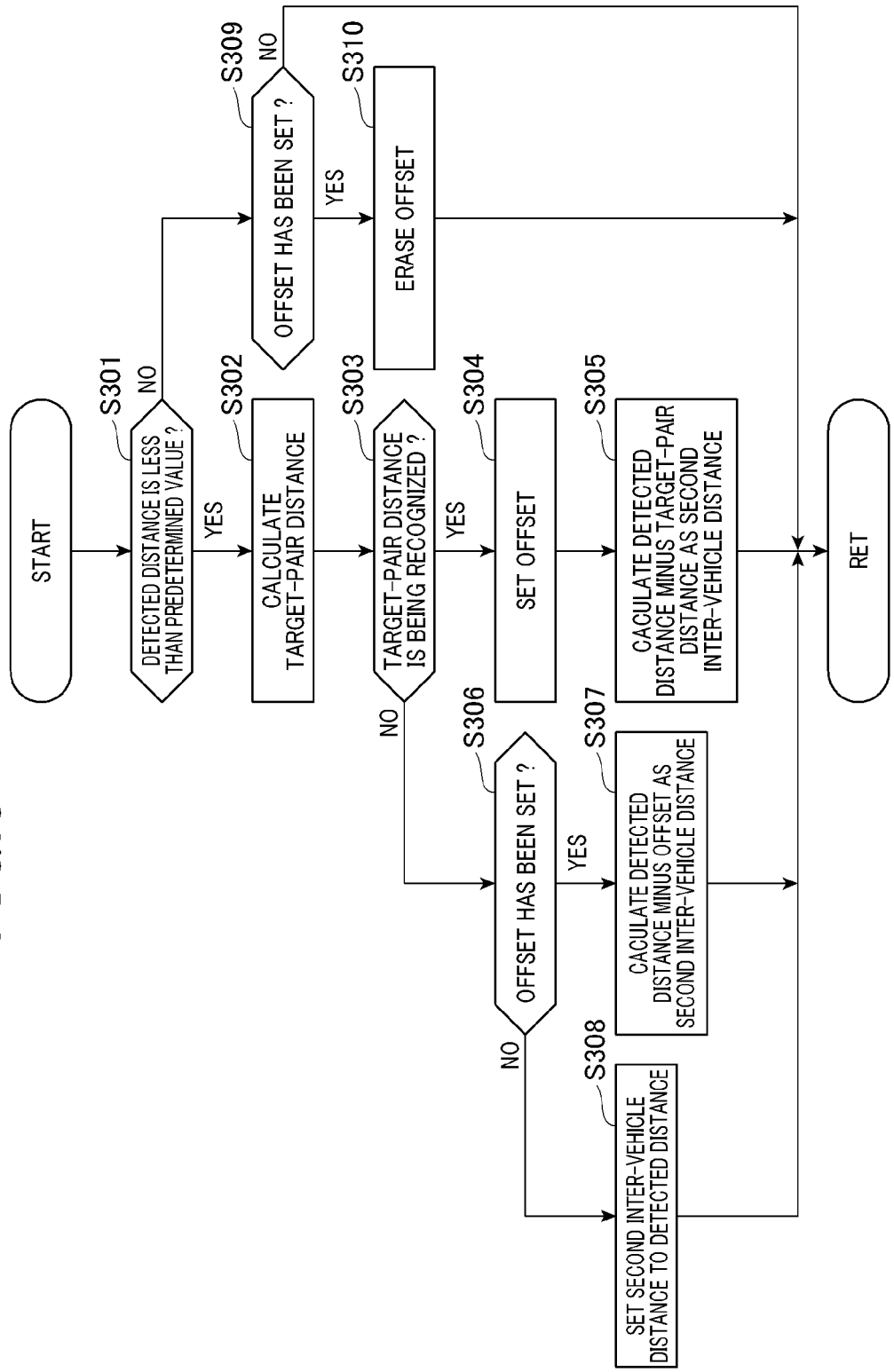
FIG. 8 is a flowchart of the target-pair distance determination process performed in the ACC ECU.
Figure 9:
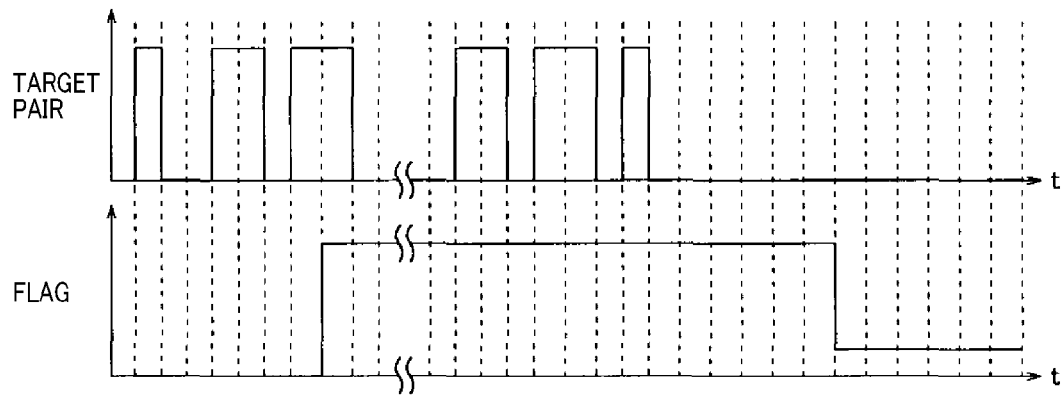
FIG. 9 is an example of the target-pair distance determination process performed in the ACC ECU.

The target-pair distance determination process in step S13 of FIG. 6 will now be explained. Referring to FIG. 8, in step S301, it is determined whether or not the detected distance between the preceding vehicle (target) and the subject vehicle is less than a predetermined value. If in step S301 it is determined that the detected distance is less than the predetermined value, then in step S302 the target-pair distance is calculated in the presence of the target pair. In step S303, it is determined whether or not the target-pair distance is recognized for a predetermined period of time or more. For example, as shown in FIG. 9, if the target-pair distance is detected a predetermined number of times or more within a set time, then it is determined that the target-pair distance is being recognized and a flag is set.

If it is determined in step S303 that the target-pair distance is recognized for the predetermined period of time or more, then in step S304 the target-pair distance is set as an offset. Subsequently, in step S305, a corrected distance, as a second inter-vehicle distance, is calculated by subtracting the target-pair distance from the detected distance.

If it is not determined in step S303 that the target-pair distance is recognized for the predetermined period of time or more, then in step S306 it is determined whether or not the offset has been set. If it is determined that the offset has been set, then in step S307 a corrected distance, as a second inter-vehicle distance, is calculated by subtracting the offset from the detected distance. If it is determined that the offset is unset, then in step S308 the second inter-vehicle distance is set to the detected distance.

If in step S301 it is determined that the detected distance between the preceding vehicle (target) and the subject vehicle is equal to or greater than the predetermined value, then in step S309 it is determined whether or not the offset has been set. If in step S309 it is determined that the offset has been set, then in step S310 the offset is erased (or invalidated). For example, the offset is set to zero. If in step S309 it is determined that the offset is unset, then the process ends.

A low reflection signal level from the non-target reflation point may cause the detected position of the non-target reflation point to be varied forward or backward in the traveling direction. If the non-target reflection point is displaced forward in the traveling direction, the target-pair distance will decrease. If the offset calculated based on the target-pair distance is updated to be decreased, the inter-vehicle distance between the preceding vehicle and the subject vehicle may become less than the target inter-vehicle distance. Therefore, preferably, the target-pair distance is only updated to be increased.

Figure 10:
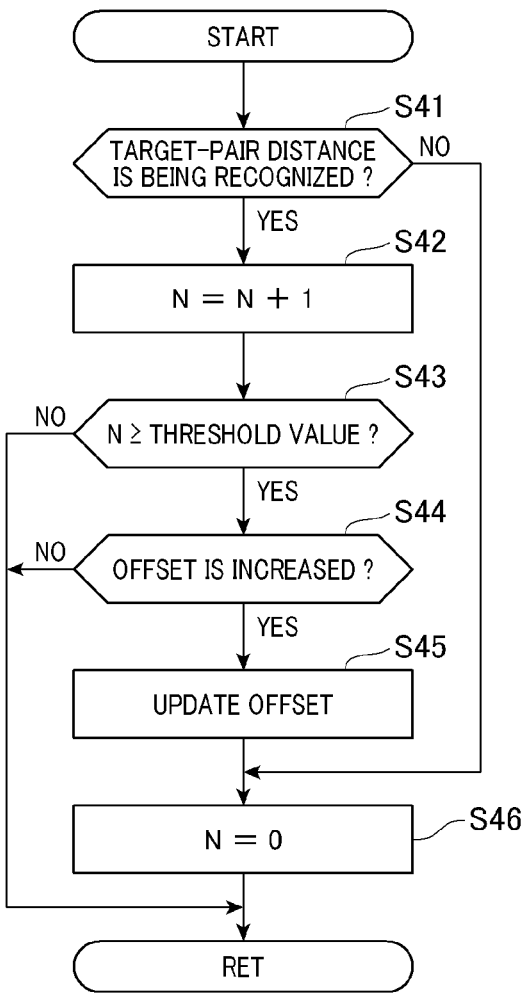
FIG. 10 is a flowchart of an offset updating process.

Referring to FIG. 10, in step S41, it is determined whether or not the target-pair distance is being recognized. If in step S41 it is determined that the target-pair distance is being recognized, then in step S42 a counter N is incremented by one, where the initial value of the counter N is set to zero. In step S43, it is determined whether or not the counter N is equal to or greater than a predetermined threshold value. The predetermined threshold value is a positive integer greater than one and may be set by experiments. If in step S43 it is determined that the counter N is equal to or greater than the predetermined threshold value, then in step S44 it is determined whether or not the current value of the target-pair distance is greater than the previous value of the target-pair distance. If in step S44 the current value of the target-pair distance is greater than the previous value, then in step S45 the offset is updated to be increased. In step S46, the counter N is reset. If in step S41 it is determined that the target-pair distance is not being recognized, then in step S46 the counter N is reset. In addition, if in step S43 it is determined that the counter N is less than the predetermined threshold value or if in step S44 the current value of the target-pair distance is equal to or less than the previous value, then the process ends.

(Allowance/Inhibition Determination Process)

Figure 11:
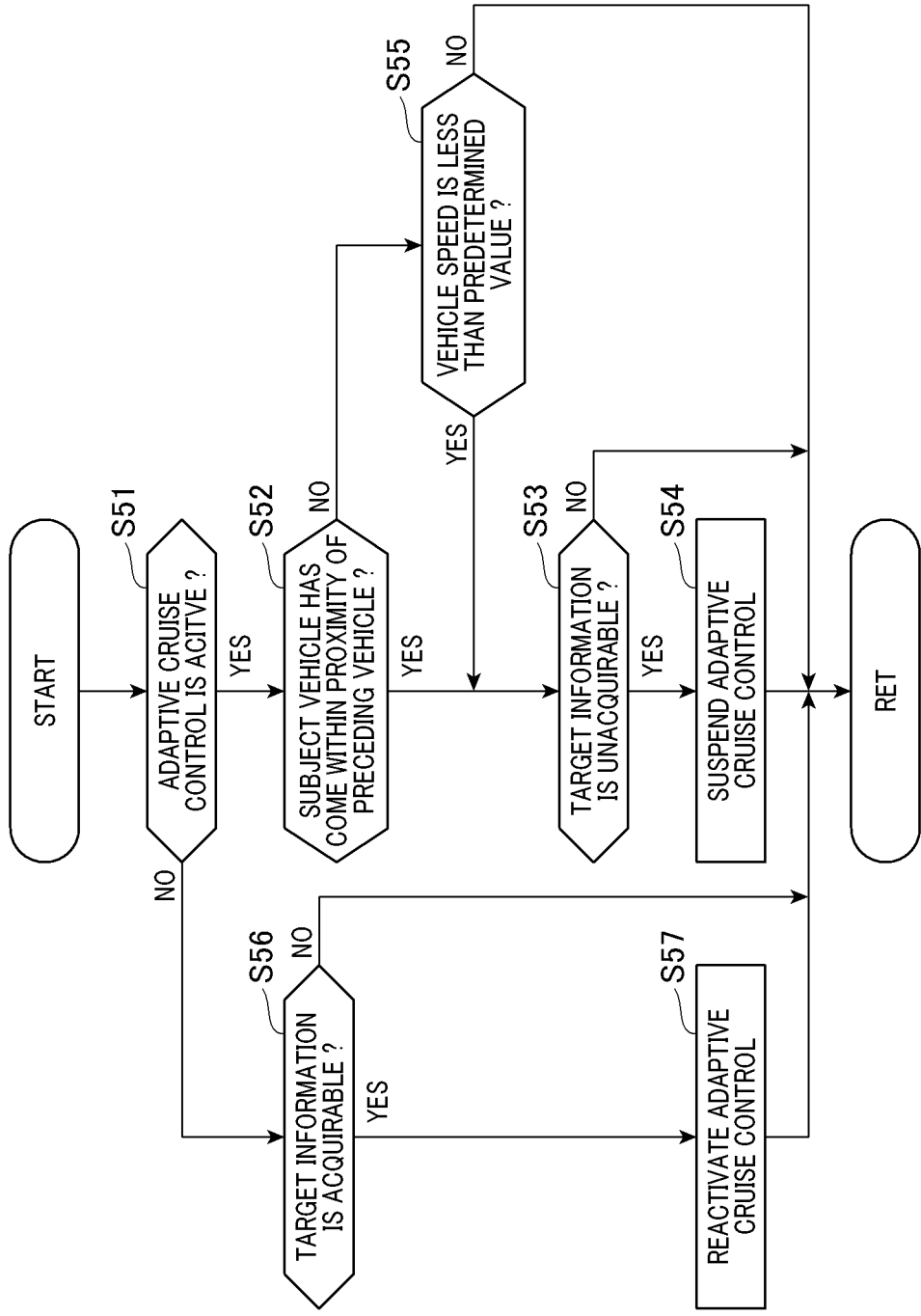
FIG. 11 is a flowchart of an allowance/inhibition determination process performed in the ACC ECU.

The allowance/inhibition determination process in step S16 of FIG. 6 will now be explained. The following processing steps are repeatedly performed under situations where the subject vehicle is not switching lanes. Referring to FIG. 11, in step S51, it is determined whether or not the adaptive cruise control is active. If in step S51 it is determined that the adaptive cruise control is active, then in step S52 it is determined whether or not the subject vehicle is approaching the preceding vehicle, that is, whether or not the subject vehicle has come within a certain proximity of the preceding vehicle. If in step S52 it is determined that the subject vehicle has come within a certain proximity of the preceding vehicle, then in step S53 it is determined whether or not the target information for identifying the rear end of the preceding vehicle is unacquirable. For example, in the case that the specific target on the preceding vehicle is unexpectedly much displaced forward or in the case that the target information is no longer stably acquired, it is determined that the target information is unacquirable. If in step S53 it is determined that the target information is unacquirable, then in step S54 the adaptive cruise control is suspended or inhibited and the subject vehicle transitions to the direct operation by the driver. A user may then be notified that the adaptive cruise control is suspended and the subject vehicle has transitioned to the direct operation by the driver, via visual messages on a display screen of a display (not shown), audio messages from a speaker (not shown) or the like. While the adaptive cruise control is suspended, acquisition of information from the radar device 11, the engine ECU 13, and the brake ECU 14 is continued.

If in step S52 it is determined that the subject vehicle is not within a certain proximity of the preceding vehicle, then in step S55 it is determined whether or not the speed of the subject vehicle is within a predetermined low speed range. That is, it is determined whether or not the speed of the subject vehicle is less than a predetermined value. If in step S55 it is determined that the speed of the subject vehicle is within the predetermined low speed range, then the process proceeds to step S53. If in step S53 it is determined that the target information is unacquirable, then the process proceeds to step S54. If in step S55 it is determined that the speed of the subject vehicle is out of the predetermined low speed range, then the process ends. Then the adaptive cruise control is continued to be active.

If in step S51 it is determined that the adaptive cruise control is inactive, that is, the adaptive cruise control was suspended in step S54 in the previous cycle, then the process proceeds to step S56. In step S56, it is determined whether or not the target information for identifying the rear end of the preceding vehicle is acquirable. For example, in the case that the inter-vehicle distance between the preceding vehicle and the subject vehicle is equal to or greater than a predetermined value or in the case that the relative speed of the preceding vehicle is equal to or greater than a predetermined value, leading to an increased inter-vehicle distance between the preceding vehicle and the subject vehicle, it is determined that the target information is acquirable.

If in step S56 it is determined that the target information is acquirable, then the process proceeds to step S57, where the inhibition of the adaptive cruise control is removed. That is, the adaptive cruise control is allowed to be reactivated. If in step S56 it is determined that the target information is unacquirable, then the process ends. In such a case, the reactivation of the adaptive cruise control is continued to be inhibited.

(Examples)

Figure 12:
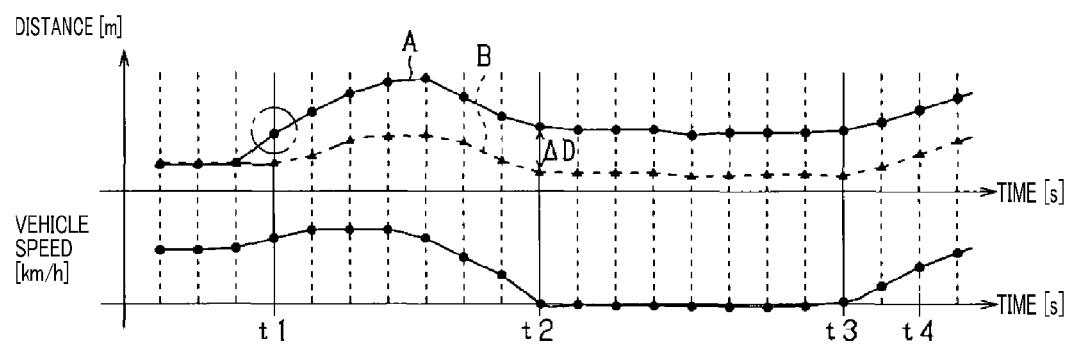
FIG. 12 is an example of the adaptive cruise control process performed in the ACC ECU.

Examples of the present embodiment will now be explained. FIG. 12 shows an example where it is assumed that the first inter-vehicle distance is a shortest inter-vehicle distance between the preceding vehicle and the subject vehicle. In FIG. 12, "A" represents the detected distance acquired from the radar device 11 and "B" represents the estimated distance B substantially equal to the actual inter-vehicle distance between the preceding vehicle and the subject vehicle. In this example, it is assumed that the preceding vehicle is a large low-floor vehicle.

If before time t1 the preceding vehicle 70 and the subject vehicle 80 are apart from each other, the detection zone that spans the detection angle θ of the radar waves may include the rear end 72 of the preceding vehicle 70, which allows the rear end 72 of the preceding vehicle 70 to be detected as a target (see FIG. 3A). In such a situation, it is determined that the radar waves are neither overriding nor underriding the rear end 72 of the preceding vehicle 70. Therefore, the inter-vehicle distance between the preceding vehicle and the subject vehicle may be controlled based on the detected distance from the radar device 11.

If at time t1 the inter-vehicle distance between the preceding vehicle and the subject vehicle decreases as the subject vehicle 80 approaches the preceding vehicle 70, the rear end 72 of the preceding vehicle 70 is placed out of the detection zone that spans the detection angle θ of the radar waves, so that the rear end 72 of the preceding vehicle 70 becomes undetectable (see FIG. 3B). In such a situation, it is determined that the radar waves are overriding or underriding the rear end 72 of the preceding vehicle 70. Then, the adaptive cruise control is implemented using the estimated distance calculated based on the relative speed Vz.

If at time t2 the subject vehicle and the preceding vehicle stop for waiting at traffic lights or the like, a difference between the estimated vehicle and the detected distance during the stationary state is stored as the offset ΔD. The ACC ECU 12 calculates the first inter-vehicle distance by subtracting the offset ΔD from the detected distance as the inter-vehicle distance during the stationary state.

If at time t3 the preceding vehicle and the subject vehicle are started, switching to the adaptive cruise control based on the estimated distance is made due to underriding of the radar waves. If at time t4 the inter-vehicle distance between the preceding vehicle and the subject vehicle exceeds the predetermined value, the radar device 11 becomes able to detect the rear end 72 of the preceding vehicle 70, which allows the determination of whether or not the radar waves are underriding the rear end 72 of the preceding vehicle 70 to be ceased. Instead of the estimated distance, the detected distance is recognized as the inter-vehicle distance. Then, the adaptive cruise control based on the actual inter-vehicle distance acquired from the radar device 11 is implemented.

Figure 13:
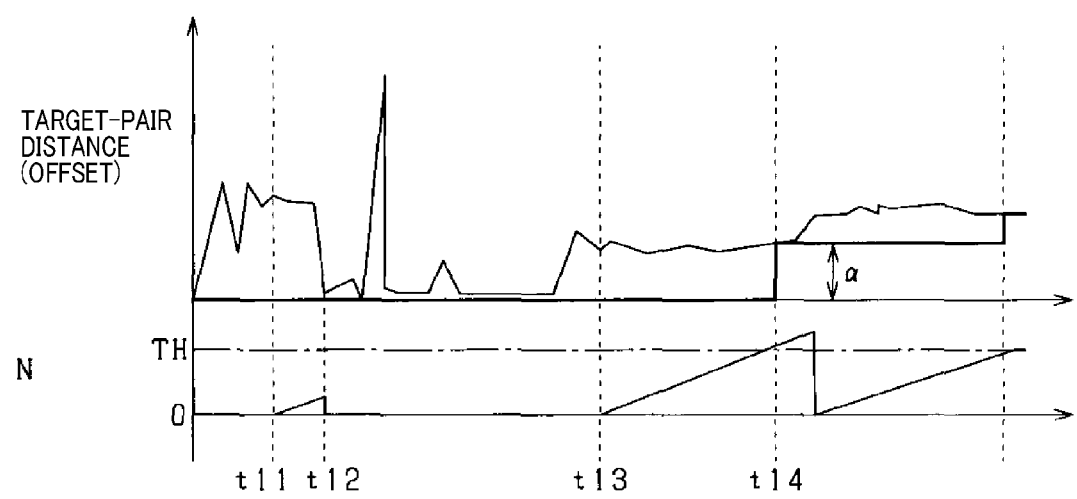
FIG. 13 is another example of the adaptive cruise control process performed in the ACC ECU.

Another example of the present embodiment will now be explained with reference to FIG. 13. FIG. 13 shows an example where it is assumed that the second inter-vehicle distance calculated in the target-pair distance determination process is determined to be a shortest inter-vehicle distance between the preceding vehicle and subject vehicle.

The target-pair distance determination process is initiated before time t11. Upon detection of the target pair, the target-pair distance is calculated. If at time t11 it is determined that the target-pair distance has been detected for the predetermined period of time or more, counting of the counter N is started and then the target-pair distance is recorded as the offset. At or after time t11, the adaptive cruise control based on the second inter-vehicle distance calculated by subtracting the target-pair distance from the detected distance is implemented.

If at time t12 it is determined that the target-pair distance is no longer recognized, then the counter N is reset (N=0). It is not determined until time t13 that the target-pair distance is being recognized. Therefore, the adaptive cruise control based on the second inter-vehicle distance calculated by subtracting the offset from the detected distance is implemented.

If at time t13 it is determined that the target-pair distance is being recognized, the counting of the counter N is restarted. If at time t14 it is determined that the counter N is equal to or greater than the threshold value TH and the target-pair distance is increased, the offset is updated to be increased by an increase a in the target-pair distance. Thereafter, the counter N is reset (N=0).

The present embodiment of this disclosure can provide the following advantages.

(i) When the subject vehicle travels following the preceding vehicle, two situations may occur. One situation is that a target (that is a reflecting portion) of the preceding vehicle is located at the rear end position of the preceding vehicle, and the other situation is that the target on the preceding vehicle is located forward of the rear end position of the preceding vehicle. These two situations may occur alternately. With this in mind, when the reflecting portion of the preceding vehicle is located at the rear end position of the preceding vehicle, the adaptive cruise control is implemented based on the inter-vehicle distance determined from the detected distance, that is, a distance between the rear end of the preceding vehicle and the subject vehicle. When the reflecting portion of the preceding vehicle is displaced forward of the rear end position of the preceding vehicle, the adaptive cruise control is implemented based on the estimated distance that is a distance between the rear end of the preceding vehicle and the subject vehicle calculated based on a variation of the inter-vehicle distance per predetermined time of period calculated using the relative speed between the preceding vehicle and the subject vehicle.

(ii) When the reflecting portion of the preceding vehicle is displaced forward of the rear end of the preceding vehicle, the inter-vehicle distance determined from the detected distance may abruptly decrease due to forward displacement of the reflecting portion. In contrast, despite reflecting the forward displacement of the reflecting portion, the estimated distance calculated based on the relative speed is less prone to abruptly decrease. Therefore, proper switching between the adaptive cruise control based on the detected distance and the adaptive cruise control based on the estimated distance can prevent incorrect understanding of the inter-vehicle distance, thereby enabling the adaptive cruise control to be implemented properly.

(iii) In the radar device 11 configured such that the distance to the target is continuously calculated at a predetermined frequency, when the radar waves override or underride the rear end of the preceding vehicle (or when the reflecting portion of the preceding vehicle located at the rear end is displaced forward of the rear end of the preceding vehicle), the variation of the detected distance to the rear-end target of the preceding vehicle for one calculation cycle may abruptly increase. Therefore, with reference to the distance variations per predetermined period of time, it can be correctly determined whether or not the overriding or underriding has occurred.

(iv) When the subject vehicle approaches the preceding vehicle during travel of the both vehicles, the radar waves may override or underride the rear end of the preceding vehicle. Thereafter, when the subject vehicle gets away from the preceding vehicle, the radar waves may cease to override or underride the rear end of the preceding vehicle. When the radar waves cease to override or underride the rear end of the preceding vehicle, return from the adaptive cruise control based on the estimated distance to the adaptive cruise control based on the detected distance is allowed. Thus, the adaptive cruise control can be properly implemented throughout the travel.

(v) When both the preceding vehicle and the subject vehicle stop while the radar waves are overriding or underriding the rear end of the preceding vehicle, a difference between the detected distance to the rear-end target of the preceding vehicle and the estimated distance at the time the subject and preceding vehicles are stopped is calculated as the offset. Using the calculated offset, the inter-vehicle distance between the preceding vehicle and the subject vehicle during a stationary state of the preceding vehicle and the subject vehicle is calculated. In such a configuration, even when the subject vehicle starts to move before it is determined that the preceding vehicle has started, the rear end position of the preceding vehicle van be correctly estimated.

(vi) When it is determined that both the preceding vehicle and the subject vehicle have started from the stationary state, the switch to the adaptive cruise control based on the estimated distance is made. This allows the adaptive cruise control between the preceding vehicle and the subject vehicle to be properly implemented.

(Modifications)

Some modifications to the above embodiment that may be devised without departing from the spirit and scope of the present invention.

(a) In the target-displacement determination process, when the detected distance abruptly decreases in a situation where in step S21 it is determined that the radar waves are underriding the rear end of the preceding vehicle, it is likely that the radar device 11 has detected the rear end of the preceding vehicle. Therefore, instead of the estimated distance, the detected distance may be used as the inter-vehicle distance. Besides, when the subject vehicle is spaced apart from the preceding vehicle by a distance such that the rear end of preceding vehicle is detectable by the radar device 11 of the subject vehicle, instead of the estimated distance, the detected distance may be used as the inter-vehicle distance. Whether or not the rear end of the preceding vehicle is detectable by the radar device 11 of the subject vehicle can be determined depending on the specification of the radar device 11.

(b) In the target-pair distance determination process, when a target recognized by the radar device 11 is displaced toward the subject vehicle through, for example, an unexpected anterior-to-posterior target change, the detected distance may be excessively decreased by the offset correction. Therefore, when the detected distance to the target recognized by the radar device 11 abruptly decreases, the offset correction may be suspended. This can suppress such a drawback that the detected distance to the recognized target may be excessively decreased by the offset correction.

(c) In the target-pair distance determination process, when another target pair is newly detected after it is determined that the detected distance is abruptly decreased by the offset correction and then the offset correction is suspended, the target-pair distance for the newly detected target may be set as an offset. In such a case, the offset correction may be unsuspended or resumed immediately.

(d) In the target-pair distance determination process, the ACC ECU 12 may be configured to directly acquire the reflected wave signal of the radar device 11, where the reflected waves may be analyzed in the ACC ECU 12, thereby enabling the ACC ECU 12 to determine the presence or absence of a non-target reflection point that is a reflection point other than the target recognized by the radar device 11 and closer to the subject vehicle than the target.

(e) In the embodiment described in detail above, the radar device 11 is used as a distance detection sensor. Alternatively or additionally, a camera or a stereoscopic camera may be used. Also with use of the camera or the stereoscopic camera, similar information about the target may be acquired. The radar and the stereoscopic camera are different in the detection range and accuracy. Therefore, advantageously, the subject vehicle may be equipped with both the radar and the stereoscopic camera, where the radar and the stereoscopic camera can be complementarily used to implement sensor fusion based distance detection. That is, in the sensor fusion based distance detection, the stereoscopic camera may be used to acquire short-range distance information and a lateral position of a near target that is difficult for the radar device 11 to detect, and the radar device 11 may be used to acquire mid- to long range distance information and a lateral position of a remote target that is difficult for the stereoscopic camera to detect. Besides, the target information about the preceding vehicle or the like may be acquired using a ranging sensor that uses sound waves, light waves, radio waves or the like.

(f) The vehicle control apparatus may be equipped with not only the ACC function, but also either or both of pre-crash safety (PCS) and lane-keeping assist (LKA) functions. In such a case, the allowance/inhibition determiner 38 may be configured such that, in step S54 where the adaptive cruise control is suspended and the switch to the direct operation by the driver is made, only the adaptive cruise control may be suspended, or not only the adaptive cruise control, but also the PCS or LKA function may be suspended.

Whereas particular embodiments of the present invention have been described above as examples, it will be appreciated that variations of the details may be made without departing from the scope of the invention. One skilled in the art will appreciate that the present invention can be practiced by other than the disclosed embodiments, all of which are presented in this description for purposes of illustration and not of limitation. It is noted that equivalents of the particular embodiments discussed in this description may result in the practice of this invention as well. Therefore, reference should be made to the appended claims rather than the foregoing discussion or examples when assessing the scope of the invention in which exclusive rights are claimed.

What is claimed is:

1. A vehicle control apparatus for implementing inter-vehicle distance control of a vehicle carrying the apparatus behind a preceding vehicle based on reflected waves from a target that is a reflecting portion of the preceding vehicle, the vehicle carrying the apparatus being referred to as a subject vehicle, the reflected waves being radar waves transmitted to a front of the subject vehicle and then reflected from the target, the apparatus comprising:
   a target information acquirer configured to acquire target information about the target from the reflected waves, the target information including a detected distance from the subject vehicle to the target and a relative speed between the subject vehicle and the target of the preceding vehicle;
   a distance estimator configured to calculate a variation of an inter-vehicle distance between a rear end of the preceding vehicle and the subject vehicle per predetermined time of period based on the relative speed, and calculate an estimated distance as the inter-vehicle distance between the rear end of the preceding vehicle and the subject vehicle based on the calculated variation of the inter-vehicle distance;
   a target determiner configured to determine whether or not the target of the preceding vehicle is displaced forward of the rear end of the preceding vehicle; and
   a controller configured to, when the target is present at the rear end of the preceding vehicle, implement the inter-vehicle distance control based on the detected distance from the subject vehicle to the target as the inter-vehicle distance, and when it is determined by the target determiner that the target of the preceding vehicle is displaced forward of the rear end of the preceding vehicle, implement the inter-vehicle distance control based on the estimated distance calculated by the distance estimator as the inter-vehicle distance.

2. The apparatus of claim 1, wherein
   the detected distance from the subject vehicle to the target is continuously calculated every predetermined calculation period of time, and
   the target determiner is configured to, based on a variation of the detected distance from the subject vehicle to the target that is recognized as the rear end of the preceding vehicle per predetermined calculation period of time, determine whether or not the target of the preceding vehicle is displaced forward of the rear end of the preceding vehicle.

3. The apparatus of claim 2, wherein
   the target determiner is configured to compare the variation of the detected distance from the subject vehicle to the target that is recognized as the rear end of the preceding vehicle per predetermined calculation period of time and the variation of the inter-vehicle distance per predetermined calculation period of time calculated by the distance estimator, and based on the comparison result, determine whether or not the target of the preceding vehicle is displaced forward of the rear end of the preceding vehicle.

4. The apparatus of claim 1, further comprising a return determiner configured to determine whether or not the target of the preceding vehicle has returned from a position forward of the rear end of the preceding vehicle to the rear end,
wherein the controller is configured to, when it is determined by the return determiner that the target of the preceding vehicle has returned from a position forward of the rear end to the rear end, return from the inter-vehicle distance control based on the estimated distance to the inter-vehicle distance control based on the detected distance.

5. The apparatus of claim 4, wherein the return determiner is configured to, when a difference between the detected distance from the subject vehicle to the target recognized as the rear end of the preceding vehicle and the estimated distance is less than a predetermined value, determine that the target of the preceding vehicle has returned from a position forward of the rear end to the rear end.

6. The apparatus of claim 4, wherein
the detected distance from the subject vehicle to the target is continuously calculated every predetermined calculation period of time, and
the return determiner is configured to, based on a variation of the detected distance to the target recognized as the rear end of the preceding vehicle per predetermined calculation period of time, determine whether or not the target of the preceding vehicle has returned from a position forward of the rear end to the rear end.

7. The apparatus of claim 1, further comprising an offset calculator configured to, when at the time both the preceding vehicle and the subject vehicle are stopped the target recognized as the rear end of the preceding vehicle is located at a position forward of the rear end of the preceding vehicle, calculate an offset that is a difference between the detected distance from the subject vehicle to the target recognized as the rear end of the preceding vehicle and the estimated distance; and
a stationary-state distance calculator configured to, during a stationary state of the preceding vehicle and the subject vehicle, calculate a stationary-state inter-vehicle distance by subtracting the offset calculated by the offset calculator from the detected distance from the subject vehicle to the target recognized as the rear end of the preceding vehicle.

8. The apparatus of claim 1, wherein the controller is configured to, when both the preceding vehicle and the subject vehicle are stopped whilst it is determined that the target recognized as the rear end of the preceding vehicle is located at a position forward of the rear end of the preceding vehicle and then both the preceding vehicle and the subject vehicle are started, implement the inter-vehicle distance control based on the estimated distance calculated by the distance estimator.

9. The apparatus of claim 1, further comprising:
a target-pair distance determiner configured to, in the presence of a target pair of the preceding vehicle that is a pair of a target and a non-target reflection point closer to the subject vehicle than the target, calculate a separation distance between the target and the non-target reflection point of the target pair, the separation distance being referred to as a target-pair distance, and when the target-pair distance is recognized for a predetermined period of time or more, set the target-pair distance of the target pair as an offset, the target-pair distance determiner being further configured to, when the target-pair distance is recognized for the predetermined period of time or more, output a first corrected distance as a second inter-vehicle distance calculated by subtracting the target-pair distance from the detected distance to the target, and when the target-pair distance is recognized for less than the predetermined period of time, output a second corrected distance as a second inter-vehicle distance calculated by subtracting the offset from the detected distance to the target; and
a distance selector configured to select a shortest one of the detected distance acquired from the target information acquirer, a first inter-vehicle distance that is the estimated distance calculated by the distance estimator, and the second inter-vehicle distance calculated by the target-pair distance determiner,
wherein the controller is configured to implement the inter-vehicle distance control based on the inter-vehicle distance selected by the distance selector.

* * * * *